(12) United States Patent
Radhakrishnan et al.

(10) Patent No.: US 10,067,728 B2
(45) Date of Patent: Sep. 4, 2018

(54) TECHNIQUES TO INDEPENDENTLY CONTROL DISPLAY SEGMENTS OF A DISPLAY PANEL

(71) Applicant: INTEL CORPORATION, Santa Clara, CA (US)

(72) Inventors: Prakash K. Radhakrishnan, Portland, OR (US); Nausheen Ansari, Folsom, CA (US); Seh W. Kwa, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/163,615

(22) Filed: May 24, 2016

(65) Prior Publication Data
US 2016/0378421 A1     Dec. 29, 2016

(30) Foreign Application Priority Data

Jun. 24, 2015   (IN) ........................... 1883/DEL/2015

(51) Int. Cl.
  *G06F 3/14*     (2006.01)
  *G06F 3/147*    (2006.01)
  *G06F 1/16*     (2006.01)

(52) U.S. Cl.
  CPC .......... *G06F 3/1446* (2013.01); *G06F 1/1616* (2013.01); *G06F 1/1641* (2013.01); *G06F 3/147* (2013.01); *G06F 3/1423* (2013.01); *G09G 2370/042* (2013.01); *G09G 2370/10* (2013.01); *G09G 2370/12* (2013.01); *G09G 2370/16* (2013.01)

(58) Field of Classification Search
  CPC .... G06F 3/1446; G06F 1/1616; G06F 1/1641; G06F 3/1423; G09G 2370/042; G09G 2370/10; G09G 2370/12; G09G 2370/16; G09G 2300/026
  USPC ........... 345/1.1–1.3; 370/351–430, 464–545; 710/8–14
  See application file for complete search history.

(56) References Cited

U.S. PATENT DOCUMENTS

| 2003/0071832 | A1 | 4/2003 | Branson |
| 2007/0201492 | A1 | 8/2007 | Kobayashi |
| 2013/0271392 | A1 | 10/2013 | Lyons |
| 2014/0115192 | A1 | 4/2014 | Hunkins et al. |

FOREIGN PATENT DOCUMENTS

KR   20110026668   8/2012

OTHER PUBLICATIONS

International Search Report and Written Opinion received for PCT Patent Application No. PCT/Us2016/033973, dated Sep. 9, 2016, 18 pages.

*Primary Examiner* — Michael Pervan

(57) ABSTRACT

Various embodiments are generally directed to an apparatus, method and other techniques to identify one or more display segments of a display panel, each display segment associated with one of a plurality of lanes of a main link coupled with the interface, independently control enabling and disabling of the display segments and associated lanes, and communicate information on each of the lanes of the main link associated with enabled display segments, and to withhold communicating information on each of the lanes of the main link associated disabled display segments.

25 Claims, 13 Drawing Sheets

700

```
┌─────────────────────────────────────────────┐
│ IDENTIFY ONE OR MORE DISPLAY SEGMENTS OF A  │
│ DISPLAY PANEL, EACH DISPLAY SEGMENT         │
│ ASSOCIATED WITH ONE OF A PLURALITY OF LANES │
│ OF A MAIN LINK COUPLED WITH THE INTERFACE   │
│                    705                      │
└─────────────────────────────────────────────┘
                      │
┌─────────────────────────────────────────────┐
│ INDEPENDENTLY CONTROL ENABLING AND DISABLING│
│ OF THE DISPLAY SEGMENTS AND ASSOCIATED LANES│
│                    710                      │
└─────────────────────────────────────────────┘
                      │
┌─────────────────────────────────────────────┐
│ COMMUNICATE INFORMATION ON EACH OF THE LANES│
│ OF THE MAIN LINK ASSOCIATED WITH ENABLED    │
│ DISPLAY SEGMENTS, AND TO WITHHOLD           │
│ COMMUNICATING INFORMATION ON EACH OF THE    │
│ LANES OF THE MAIN LINK ASSOCIATED DISABLED  │
│ DISPLAY SEGMENTS                            │
│                    715                      │
└─────────────────────────────────────────────┘
```

*FIG. 7*

TECHNIQUES TO INDEPENDENTLY CONTROL DISPLAY SEGMENTS OF A DISPLAY PANEL

CROSS-REFERENCE TO RELATED APPLICATIONS

This application claims the benefit of and priority to previously filed India Patent Application Serial Number 1883/DEL/2015 filed Jun. 24, 2015, the subject matter of which is incorporated herein by reference in its entirety.

TECHNICAL FIELD

Embodiments described herein generally relate techniques for independently controlling display segments of a display panel.

BACKGROUND

Over time the form factor of devices has continued to get smaller and smaller requiring novel ways to fit hardware, such as displays into these smaller form factors. Emerging foldable or flexible displays may afford the possibility of varying the screen size as a function of usage while fitting into these smaller form factors. For example, a ten inch screen may be folded into halves where only half of the screen remains active, while the other half is inactive. In another example, a ten inch screen may be folded into halves having two separate viewing screens for entertainment or gaming. When a user is finished with using the device, the display may be folded into an even smaller form factor for storage. With these possibilities there presents opportunities to address optimization with controlling displays.

BRIEF DESCRIPTION OF THE DRAWINGS

FIG. 7 illustrates an example embodiment of a second logic flow.

DETAILED DESCRIPTION

Figure 1:
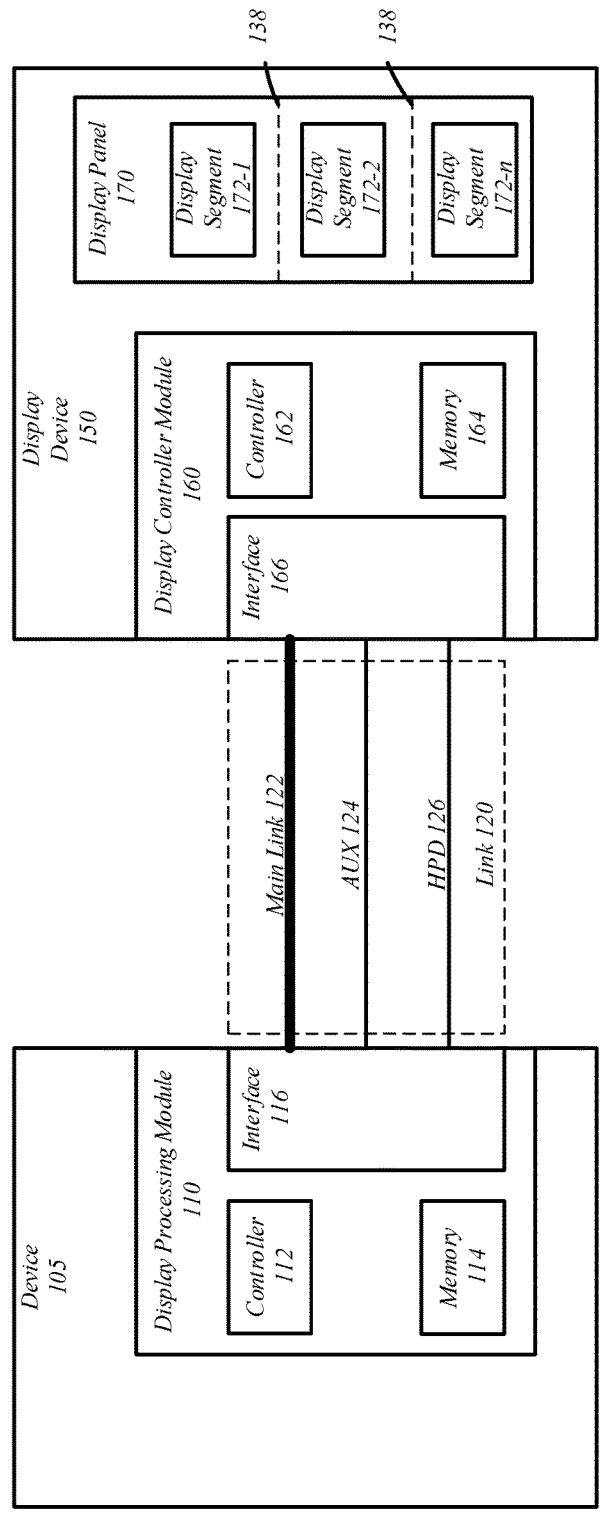
FIG. 1 illustrates an example embodiment of a computing system.

Various embodiments are generally directed to independently controlling display segments of a display panel. In embodiments, a display panel may be a foldable or flexible display where each fold may create a separate display segment. Thus, each display segment may be capable of displaying different or the same content. In addition, each display segment may be independently enabled and disabled based on whether the display segment is in use or not.

For example, embodiments may include circuitry to identify a display panel and display segments over a main link that couples the circuitry with the display panel. In some embodiments, each of the display segments may be associated with a lane of the main link. Thus, each display segment may be independently controlled (enabled and disabled) via an associated lane.

More specifically, each of the display segments may be individually enabled and disabled by communicating information over the associated lane. For example, each of the display segments and associated lanes may be independently link trained by performing a link training process. Thus, when a display segment is enabled, a link training pattern or sequence may be communicated on an associated lane of the newly enabled display segment. Further, when a display segment is disabled, a disable sequence may be communicated on a lane associated with the display segment to disable it. Therefore, embodiments may include a display panel that has particular display segments disabled while other display segments are enabled.

Embodiments may also include circuitry to communicate information on each of the lanes of the main link associated with enabled display segments to present on the display segments, and to withhold communicating information on each of the lanes of the main link associated disabled display segments. The information communicated to the enabled display segments may include pixel information of a stream to present on each of the enabled display segments, for example. Further details are provided below in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a computing system 100. In various embodiments, the computing system 100 may include a device 105 and a display device 150. The device 105 and the display device 150 may include any number of components to process and present information and may be coupled via link 120 to communicate information.

In some embodiments, the device 105 and the display device 150 may be in the same housing. For example, computing system 100 may be representative of a laptop computer, ultra-laptop computer, netbook computer, ultra-book computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and the device 105 and the display device 150 may be in the same housing.

In the same or other embodiments, the device 105 and the display device 150 may be in separate housings. For example, computing system 100 may be representative of a desktop computing device where the device 105 is located within a computer housing or chassis and the display device 150 is located within a display housing. Other examples may include any other computing device, including but not limited to, a workstation, a server computer, a router, a personal computer, a blade server, a rack mounted server, and so forth including the device 105. These other computing devices may be coupled with one or more separate displays including the display device 150 in a different housing.

The device 105 may be any type of computing device and include circuitry and logic to process information and data, such as display data. In some embodiments, the device 105 may be or partially implemented in a graphics processing unit (GPU), a video processor, a display processor, and so forth. In embodiments, the device 105 may include any number of components to process information, including a display processing module 110 having a controller 12, a memory 114, and an interface 116. In embodiments, the interface 116 may be a display port source physical layer (PHY).

The display device 150 may also be any type of computing device and include circuitry and logic to process information and data, such as display data. In some embodiments, the display device 150 may be a display controller for controlling various aspects of a display panel. The display device 150 may include any number of components to process the information include a display controller module 160 having a controller 162, a memory 164, and an interface 166. In embodiments, the interface 166 may be a display port sink physical layer (PHY).

In embodiments, the interface 116 of the device 105 may be coupled with the interface 166 of the display device 150 via the link 120. The link 120 may be any type of link and the interfaces 116, 166 may operate in accordance with one or more standards such as, High-Definition Multimedia Interface (HDMI), Video Graphics Array (VGA), Digital Visual Interface (DVI), Embedded Display Port (eDP), or any other variant of DisplayPort®, for example. The link 120 may include a main link 122, an auxiliary (AUX) channel 124, and a hot plug detect (HPD) channel 126. The interfaces 116, 166 may utilize the main link 122 to communicate data and information. For example, the main link 122 may support communication of a media stream having video and audio data which can be scaled across a number of lanes, as will be discussed in more detail below. The main link 122 may use a clock data recovery (CDR) methodology where data an information is communicated without an accompanying clock signal. The receiver may generate a clock from an approximate frequency reference, and phase-aligns to the transitions in the data with a phase-locked loop. The AUX channel 124 may be used to transmit command signals, and discover the enablement and disablement of display segments. In some embodiments, the display processing module 110 and display controller module 160 may use DisplayPort Configuration Data (DPCD) to communicate information on the AUX channel 124. The HPD channel 126 may be used to detect a display panel by the display processing module 110.

The display device 150 may also include or be coupled with a display panel 170 having a number of display segments 172-n, where n may be any positive integer. Each of the display segments 172 may be capable of displaying all or part of a display scene of a media stream based on pixel information. For example, the display panel 170 may operate in an "extended" mode and a display scene may be stretched across all of the enabled display segments 172. In another example, the display panel 170 may operate in a "cloned" mode and a display scene may be cloned on each of the enabled display segments 172. The display scene may be part of a media stream that may be communicated from the device 105 to the display device 150, via interfaces 116 and 166 and may be displayed in a resolution based on the capabilities of the display panel 170.

In embodiments, the display panel 170 may be a bendable or foldable display and each of the display segments 172 may be part of a separate display portion of the display panel 170 defined by the bends or folds of the display panel 170. More specifically, the display panel 170 may have one or more hinged or creased portions 138 defining separate display portions each having a display segment 172. In an example, the display panel 170 may have two hinged or creased portions 138 defining three separate display portions each having a display segment 172. However, embodiments are not limited in this manner and the display panel 170 may include a number of hinged or creased portions 138 creating separate display portions each having a display segment 172.

Based on various usage scenarios, one or more display segments 172 may be available or not available for a user to see information at any point in time. For example, the display panel 170 may include two display segments 172 and can be bent in half. In this example, when the display panel is bent in half, only one display segment 172 may be visible and usable to a user. In another example, the display panel 170 may include three display segments 172 and may be folded such that one, two, or three display segments 172 are available to present information to a user. Thus, as will be discussed in more detail below, each of the display segments 172 can be individually controlled by information communicated across link 120. For example, each display segment 172 (and associated components) of a display panel 170 may be enabled or disabled based on whether or not the segment is available to present information. Further, each display segment 172 and associated components may be put in lower power state when they are disabled or available for a user to use. This may be advantageous to conserve battery life and power for devices.

Figure 2:
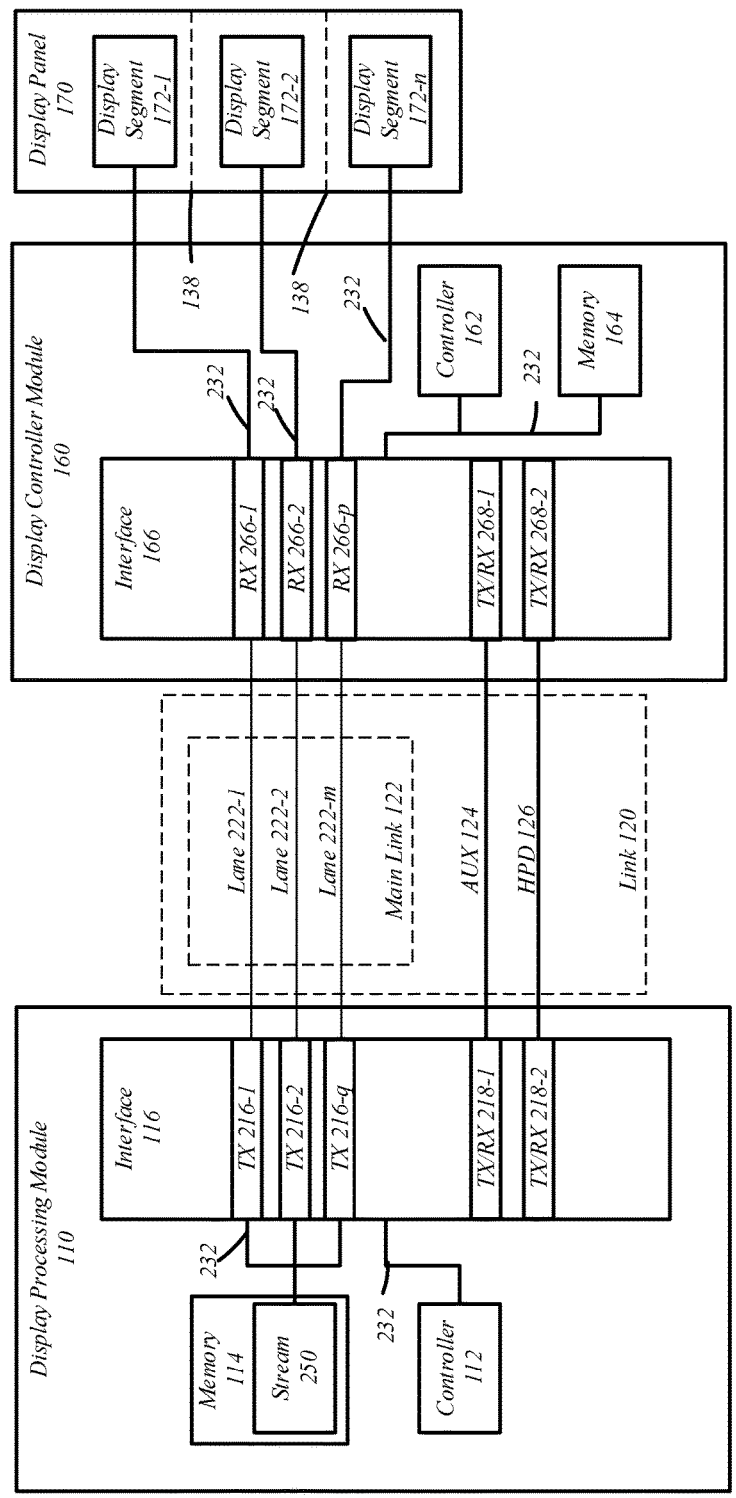
FIG. 2 illustrates an example embodiment of a second computing system.

FIG. 2 illustrates an example embodiment of a computing system 200 which further illustrates components of the computing system 100 discussed above in FIG. 1. More specifically, the computing system 200 illustrates various details of the display processing module 110, the display controller module 160, and the display panel 170 coupled via one or more interconnects 232. Interconnects 232 may be any type of bus, trace, and so forth to communicate information between the components.

As mentioned, the display processing module 110 may include a controller 112 and memory 114 coupled with an interface 116. The controller 112 may control various aspects of processing information for the display processing module 110. Further, the memory 114 may store various instructions that can be performed by the display processing module 110 and, in particular, the controller 112 to process information and data. Further, memory 114 may act as a buffer for information communicated via link 120. For example, the memory 114 may buffer a media stream 250 that may include video and display data and audio data to be communicated to the display controller 160 via link 120.

The interface 116 includes circuitry to process and communicate information including one or more transmitters 216-q, where q may be any positive integer. In embodiments, the transmitters 216 can send information, such as the stream 250, to another device, such as a display device 150 having a display controller module 160 over link 120. In some embodiments, each of the transmitters 216 can be coupled with a particular lane 222 of a main link 122 and a particular receiver 266 of interface 166. For example, transmitter 216-1 may be coupled with receiver 266-1 via lane 222-1 of the main link 122. Further, transmitter 216-2 may be coupled with receiver 266-2 via lane 222-2 of the main link 122. Thus, each transmitter 216 can communicate the stream 250 or a portion of the stream 250 to a particular receiver 266. Further, each receiver 266-p, where p may be any positive integer, can be coupled with a particular display segment 172-n to present the stream 250, where n may be any positive integer. Various embodiments may include any number of transmitters 216, lanes 222, receivers 266, and display segments 172.

The interface 116 may also include a transceiver 218-1 coupled with a transceiver 268-1 of interface 166 to communicate information over an AUX channel 124. Similarly, interface 116 can include a second transceiver 218-2 coupled with a second transceiver 268-2 of interface 166 to communicate information over an HPD channel 126. As previously mentioned, the AUX channel 124 may be used to communicate command signals, and discover the enablement and disablement of display segments. The HPD channel 126 may be used to detect a display panel by the display processing module 110.

In embodiments, the display processing module 110, and in particular, the controller 112 may perform a number of functions and operations to process streams, such as stream 250. In some embodiments, the controller 112 can identify a display device 150 having a display panel 170 and a number of display segments 172. For example, the controller 112 may receive information via the AUX channel 124 indicating the presence, enablement, and disablement of a display panel 170 and display segments 172, including a total number display segments 172, and how many display segments are 172 enabled (or disabled). Further, the controller 112 can identify an association between each of the lanes 222 and each of the display segments 172 based on information received on the AUX channel 124. For example, the controller 112 can determine that lane 222-1 is associated with display segment 172-1, lane 222-2 is associated with display segment 172-2, and so on based on information communicated via the AUX channel 124. In some embodiments, this information can be received in extended display identification data (EDID) received over the AUX channel 124. The EDID may include other information, such as a manufacturer name and serial number for the display panel 170, product type, phosphor or filter type, timings supported by the display, display size, luminance data and pixel mapping data.

In some embodiments, the controller 112 may be able to detect the presence, enablement, disablement, and association of display segments 172 via the lanes 222 themselves. More specifically, a low logic level on a lane 222 may indicate that a display segment 172 is present on that lane 222 and it is enabled. A high logic level on the lane 222 may indicate that a display segment 172 is not present or not currently enabled on a lane 222. Various embodiments are not limited in this manner, e.g. a high logic level may indicate the presence of a display segment 172 on a lane 222. In embodiments, the controller 112 may use a combination of the AUX channel 124 to identify the display panel 170 and a total number of display segments 172 and the logic level on the lanes 222 to determine whether a specific display segment 172 is enabled or disabled.

The controller 112 may also perform link training on the main link 122 to enable and train each of the lanes 222 associated with a display segment 172. The link training may include a handshaking operation on the AUX channel 124 between the interfaces 116 and 166 to ensure the correct number of lanes 222 are enabled at the right link rate with the correct drive current and equalization level. In some embodiments, the link training handshaking operation may include communicating one or more link training patterns or sequences of bits from interface 116 to interface 166. A status of a clock-recovery lock may be determined and if it has been achieved then the interface 116 communicates a second link pattern sequence to interface 166. The status of the lanes 222 are read including the bit lock, symbol lock, and inter-lane alignment. Link training is successfully and complete when the bit lock and symbol lock have been achieved on each of the configured lanes and the lanes 222 are symbol locked with proper inter-lane alignment. The controller 112 may communicate the stream 250 for presentation on the display panel 170 when link training is successful.

In embodiments, the controller 112 can also store link training information for the lanes 222 and display segments 172 based on the link training performed. In some embodiments, the link training information may include a link rate, a drive current, a pre-emphasis value, a v-swing value, and an equalization level for the lanes 222 and associated display segments 172. The controller 112 may use the link training information to retrain a link 222 and associated display segment 172. For example, each of the lanes 222 and associated display segments 172 may be disabled and enabled individually. The controller 112 may use one or more values of the link training information to enable (or re-enable) a lane 222 and associated display segment 172. By using the stored link training information to enable a link 222 and associated display segment 172 a significant amount of time may be saved.

As mentioned, the controller 112 can individually control enabling and disabling display segments 172. In some embodiments, the controller 112 may receive information or an indication to enable or disable each of the display segments 172. For example, one or more sensors may detect whether a particular display segment 172 is visible and/or usable to a user which may indicate to the controller 112 to disable or enable the particular display segments 172. One or more sensors may be located in the hinge area(s) of the of the display panel 170 to detect whether the particular display segment 172 is an in open position visible to a user, or in a closed position not visible to a user, for example. Based on the indication, the controller 112 may enable or disable the particular display segment 172. However embodiments are not limited to this example. For example, sensors can be located in different parts of the display device 150 to determine whether to enable or disable a particular display segment 172. In some embodiments, the enablement and disablement of the display segments 172 may be user initiated via an user input device.

In some embodiments, the information or indication may be communicated to the controller 112 via the AUX channel 124. However, embodiments are not limited in this manner, the controller 112 may detect a high or low voltage on a lane 222 associated with a particular display segment 172 indicating whether it should be enabled or disabled, for example. A high voltage on a lane 222 may indicate to disable the associated particular display segment 172, or vice versa. Embodiments are not limited in this manner.

If the controller 112 determines that a display segment 172 is to be enabled, the controller 112 may communicate information or an enable indication to the display control module 160, and in particular the controller 162, via the AUX channel 124 to enable the display segment 172. Alternatively or in combination, the controller 112 may cause a squelch detection by the controller 162 on a lane 222 as an indication to enable an associated display segment 172. The controller 162 may enable the indicated display segment 172 by bringing the display segment 172 and associated components such as an associated receiver 266 out of a lower power state, for example. Further, the controller 112 may also bring an associated transmitter 216 out of a lower power state.

In embodiments, the controller 112 may train or retrain a lane 222 associated with a newly enabled display segment 172. For example, the controller 112 may communicate one or more enable link training sequences or patterns over the lane 222 associated with the particular display segment 172. In some cases, the controller 112 may communicate one or more enable link training sequences or patterns based on stored link training information that may have been predetermined or determined during a previous link training. In these cases, the lane 222 may be trained more quickly than when stored training information is not used to train or retrain the link.

In some embodiments, the controller 112 may communicate a disable link training sequence or pattern on a lane 222 to disable an associated particular display segment 172 and components. The controller 162 of the display controller module 160 may detect the disable link training sequence and may cause the particular display segment 172 and associated receiver 266 to enter a lower power state to conserve power. Similarly, the controller 112 of the display processing module 110 may cause the associated transmitter 216 to enter a lower power state to conserve power.

Each of the display segments 172 may be individually enabled and disabled via communicating information over the link 120. Moreover, one or more of the display segments 172 may be enabled while one or more other display segments 172. The display segments 172 may be enabled and disabled as a stream 250 is being sent from the display processing module 110 to a display controller 160. The presentation of the stream 250 may be adjusted when the one or more display segments 172 are enabled or disabled.

For example, the display scene may be extended to a new display segment 172 if it has recently been enabled on the display panel 170. In another example, the display scene may be reduced to remaining display segments 172 when another display segment 172 has been disabled. In some embodiments, the controller 112 may control the timing of the adjustment such that it is not obvious or visible to a user of the computing system 200. For example, the controller 112 may communicate an idle pattern on a lane 222 associated with a newly enabled display segment 172 until the display panel 170 enters a vertical blanking interval. Once the display panel 170 enters a vertical blank interval, the controller 112 may transition the idle pattern to a vertical blanking identification sequence (VBID) to indicate to a newly enabled display segment 172 that it is going to receive at least portion of a stream 250 to present. The controller 112 may communicate pixel information of the stream 250 on the lane 222 associated with the newly enabled display segment 250 to present. Similarly, the controller 112 may wait for a vertical blanking interval to disable a display segment 172 to adjust the output of the stream 250 on the remaining display segments 172.

Figure 3A:
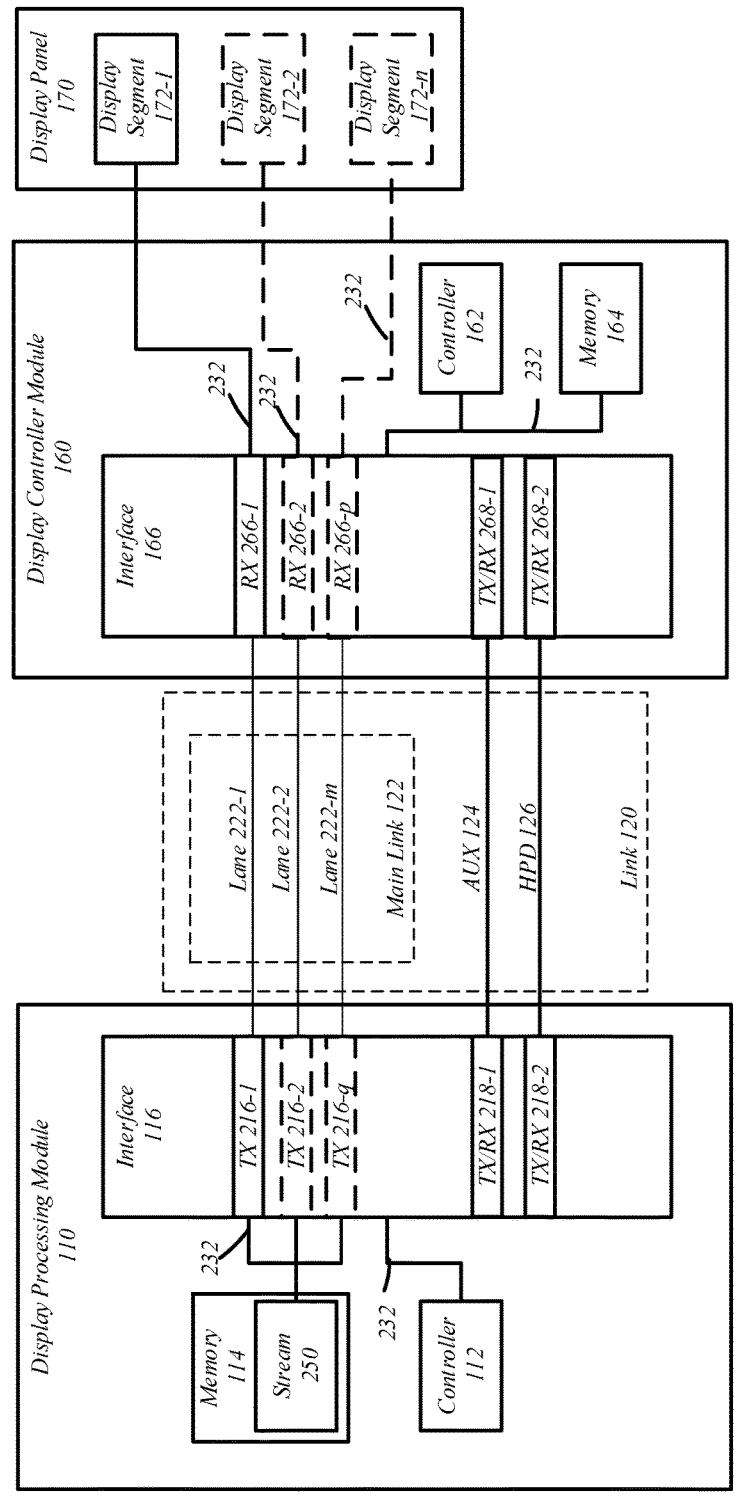
FIG. 3A illustrates an example embodiment of a computing system having enabled and disabled display segments.
Figure 3B:
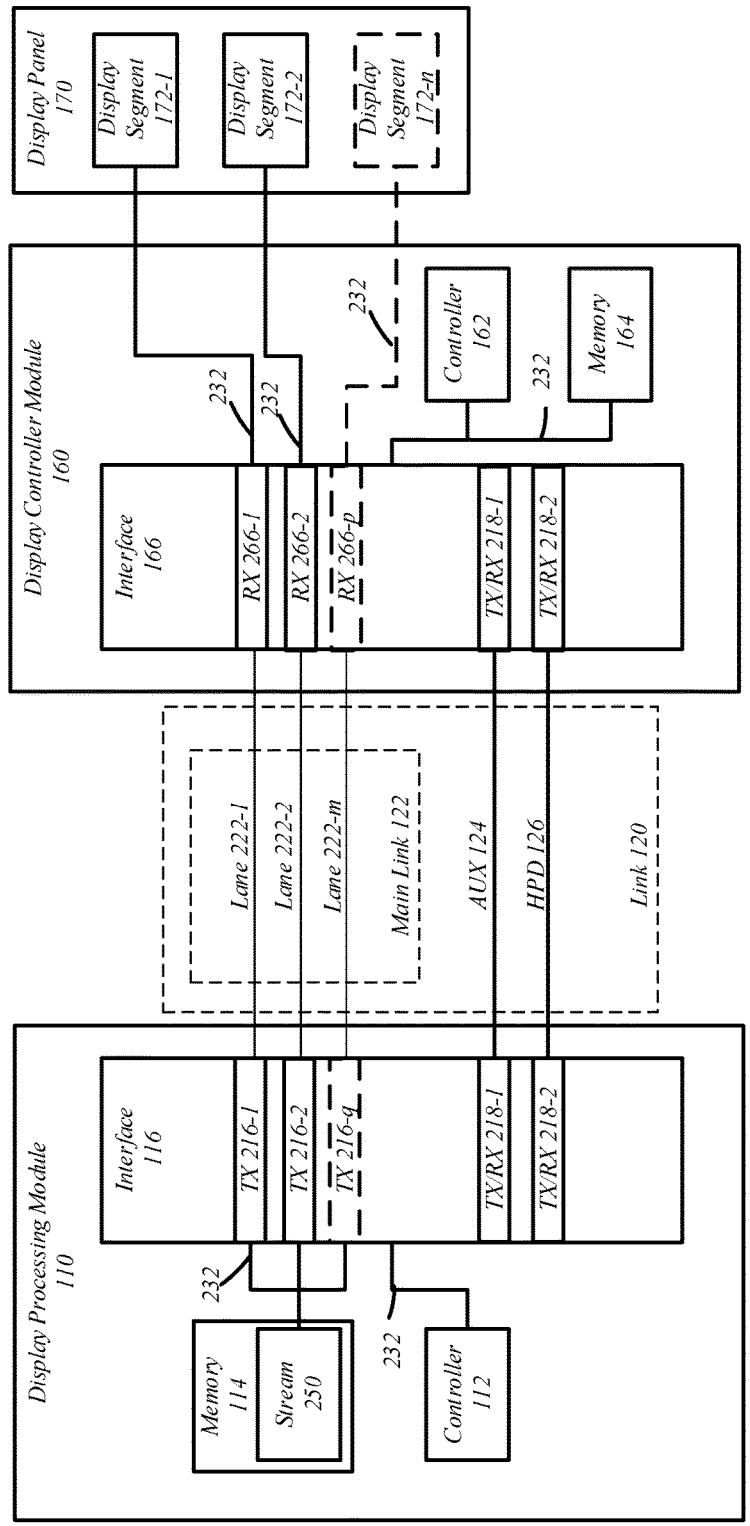
FIG. 3B illustrates an example embodiment of a second computing system having enabled and disabled display segments.
Figure 3C:
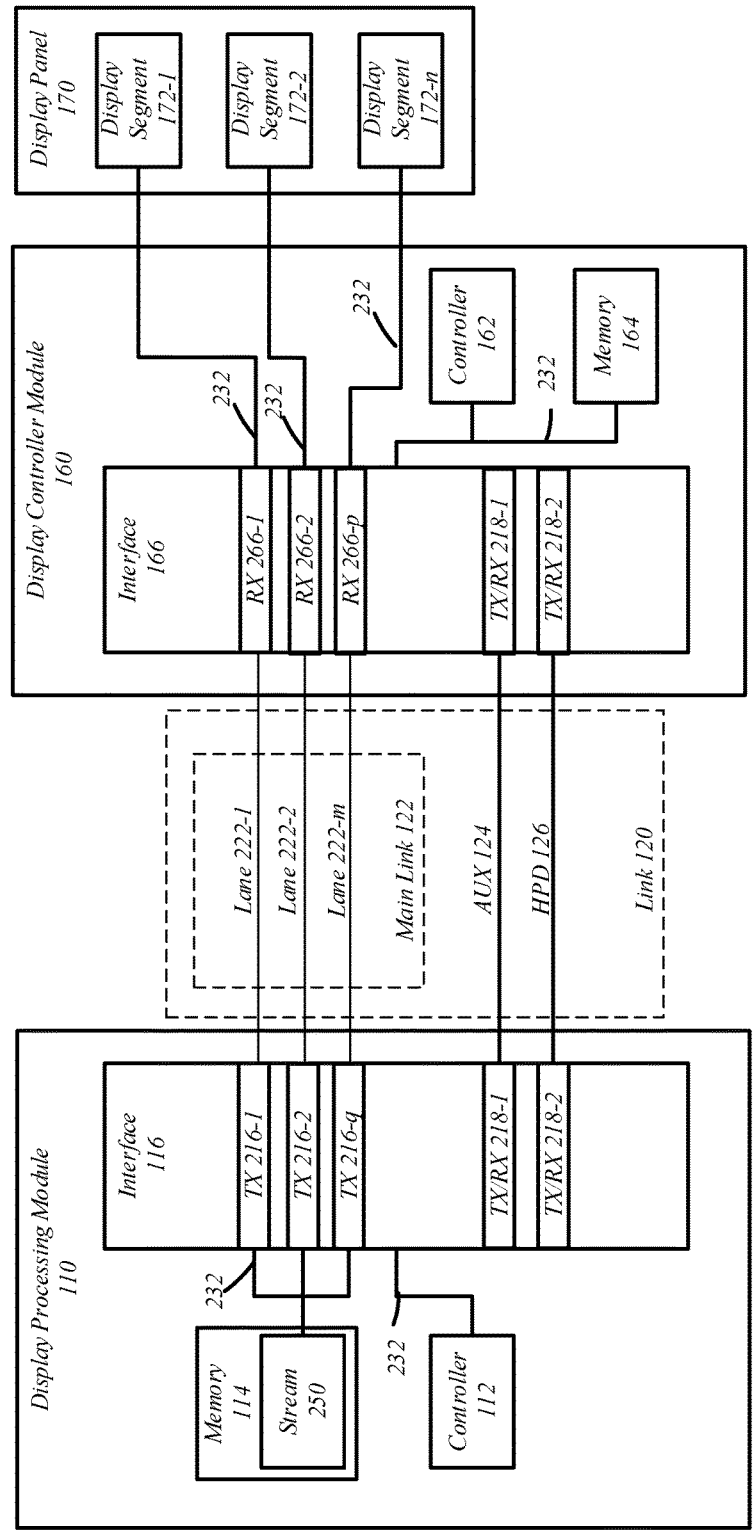
FIG. 3C illustrates an example embodiment of a third computing system having enabled and disabled display segments.

FIGS. 3A-3C illustrate example embodiments of a computing system 300 have one or more displays segments in various states of operation. In embodiments, the computing system 300 may be the same as or similar to the computing systems 100 and 200 of FIGS. 1 and 2, respectively.

FIG. 3A illustrates computing system 300 have one display segment 172-1 enabled while the remaining display segments 172-2 and 172-n are disabled. In this example, the disabled display segments 172 may be in a lower power state to conserve energy that may be saved in a battery (not shown). Similarly, one or more components associated with the disabled segments 172 may also be in a lower power state. For example, transmitters 216 and receivers 266 associated with the disabled display segments 172 may be in a lower power state.

FIG. 3B illustrates another configuration of computing system 300 having two display segments, 172-1 and 172-2, enabled to present information to user. In this example, all the remaining display segments 172, transmitters 216, and receivers 266 may be in a lower power state. FIG. 3C illustrates a third configuration of computing system 300 where all of the display segments 172-n, transmitters 216-q, and receivers 266-p where n, q, and p may be any positive integer, are enabled. In this example, none of the display segments 172 and associated components are in a lower power state and they may be in a fully operational state.

Figure 4A:
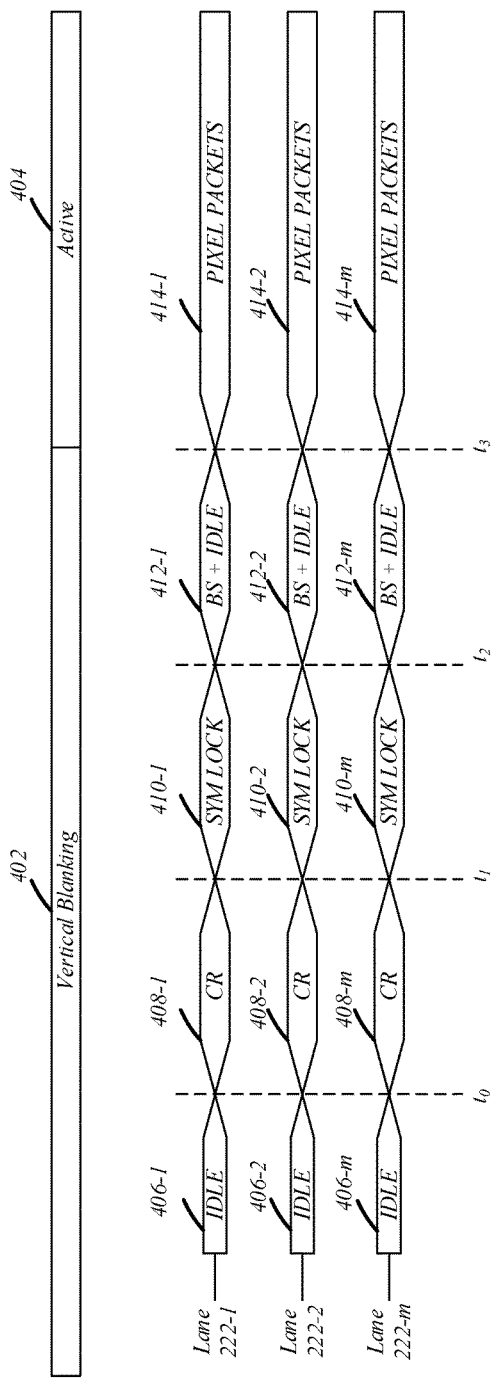
FIG. 4A illustrates an example embodiment of a set of waveforms.

FIG. 4A illustrates a diagram of waveforms 400 to present pixel information on display segments 172. In this example embodiment, the waveforms 400 may illustrate a wake-up procedure to present the pixel information on every enabled display segment 172 by communicating information over associated lanes 222. In the illustrated example the main link 122 and lanes 222 may be in a lower power state prior to time $t_0$ and/or receive one or more idle patterns 406-m, where m may be any positive integer, may be communicated on each of the lanes 222. During this time, the display panel 170 may enter or be in vertical blanking 402.

At time $t_0$, the display processing module 110 may communicate a wake-up command on the AUX channel 124 to the display controller module 160. The wake-up command may indicate that link training may be required on one or more lanes 222 of the main link 120 having enabled display segments 172. In embodiments, the wake-up command may be encoded using 8B/10B, Manchester-II, or any other suitable encoding method. The display processing module 110 may communicate an operation parameter CR 408-m on each of the lanes 222 associated with an enabled display segment 172. In some embodiments, operation parameter CR 408-m may contain a number of clock recovery symbols to be used by the display controller 160 to recover a clock from transmitted data. In some embodiments, when performing fast link training or retraining the operation parameter CR 408-m and SYM LOCK 410-m may occur simultaneously.

The display processing module 110 may transmit operation parameter symbol lock 410-m at time $t_1$ on each lanes 222 associated with enabled display segments 172. In some embodiments, symbol lock 410-m may include a link training pattern sequence required for display controller module 160 to achieve symbol lock. At time $t_2$, the display processing module 110 can communicate a BS and IDLE pattern 412-m which can include a blanking start symbol. Finally, the display processing module 110 may communicate pixel information 414-m at time $t_3$.

Figure 4B:
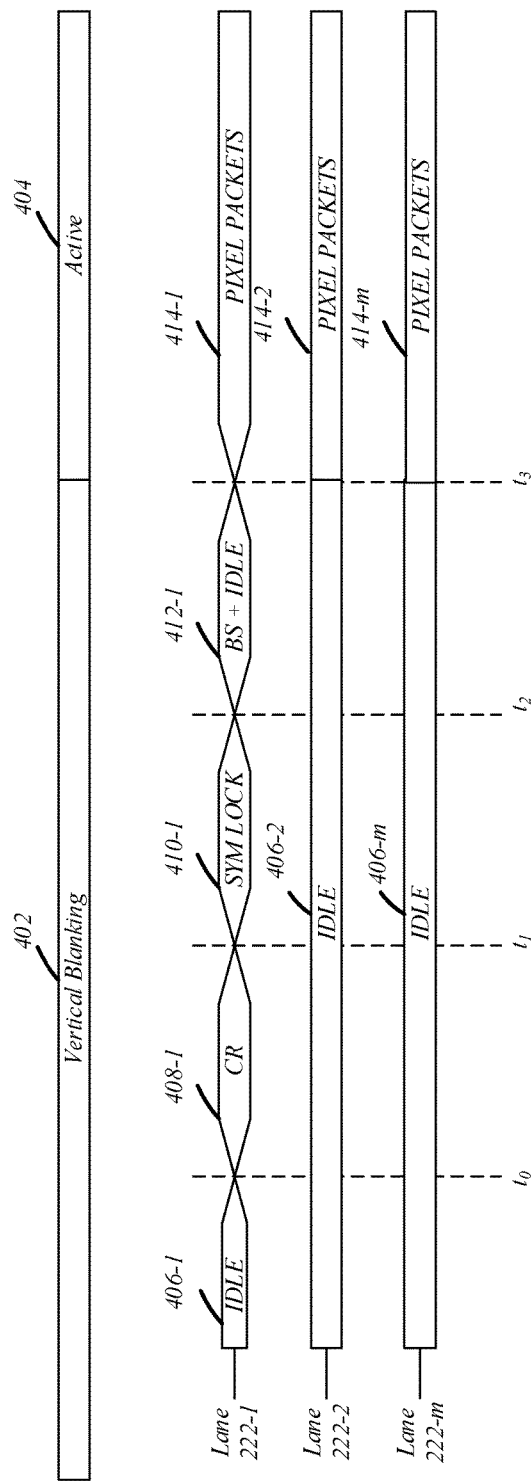
FIG. 4B illustrates an example embodiment of a second set of waveforms.

FIG. 4B illustrates a diagram of waveforms 450 to present pixel information on display segments 172. In this example embodiment, the waveforms 450 may illustrate a wake-up procedure to enable a display segment 172-1 associated with lane 222-1 during streaming while other display segments 172 have previously been enabled. In some embodiments, the enablement of the display segment 172-1 may have been triggered by a user on a detected by one or more sensors. Further, the enablement may be processed during a vertical blanking interval 402. In the illustrated example, lane 222-2 through lane 222-m correspond to previously enabled display segments 172 which may have been enabled during a previous vertical blanking interview. The previous enabled display segments 172 may be receiving a stream having pixel information. The display segment 172-1 associated with lane 222-1 may be in a lower power state and/or receive idle patterns until the display panel 170 enters the vertical blanking interval 402 and time $t_0$ is reached.

At time $t_0$, the display processing module 110 may communicate a wake-up command on the AUX channel 124 to the display controller module 160. The wake-up command may indicate that link training may be required on lane 222-1 of the main link 120 having the newly enabled display segments 172-1. In some embodiments, link training may not be required on lanes 222-2 through 222-m because they have already been trained. Idle patterns or blanking patterns may be communicated on already trained lanes.

In embodiments, the wake-up command may be encoded using 8B/10B, Manchester-II, or any other suitable encoding method. The display processing module 110 may communicate an operation parameter CR 408-1 on lane 222-1 associated with the newly enabled display segment 172-1. In some embodiments, operation parameter CR 408-1 may contain a number of clock recovery symbols to be used by the display controller 160 to recover a clock from transmitted data.

The display processing module 110 may then transmit operation parameter symbol lock 410-1 at time $t_1$ on lane 222-1. In some embodiments, symbol lock 410-1 may include a link training pattern sequence required for display controller module 160 to achieve symbol lock. In some embodiments, the link training pattern may include stored link training information from a previous link training of lane 222-1. Thus, the link training of lane 222-1 may occur more quickly than the first link training the lane 222-1.

At time $t_2$, the display processing module 110 can communicate a BS and IDLE pattern 412-1 which can include a blanking start symbol. Finally, the display processing module 110 may communicate pixel packet information 414-1 through 414-m at time t3 on each of the lanes 222-1 through 222-m corresponding with enabled display segments 172. While link training is being performed on lane 222-1 during the vertical blanking interval 402 an idle pattern 406-2 through 406-m may be communicated on lanes 222-2 through 222-m. Although FIG. 4B illustrates only one new enablement of a display segments 172, embodiments are not limited in this manner and any number of display segments 172 may be enabled at any point in time.

Figure 5A:
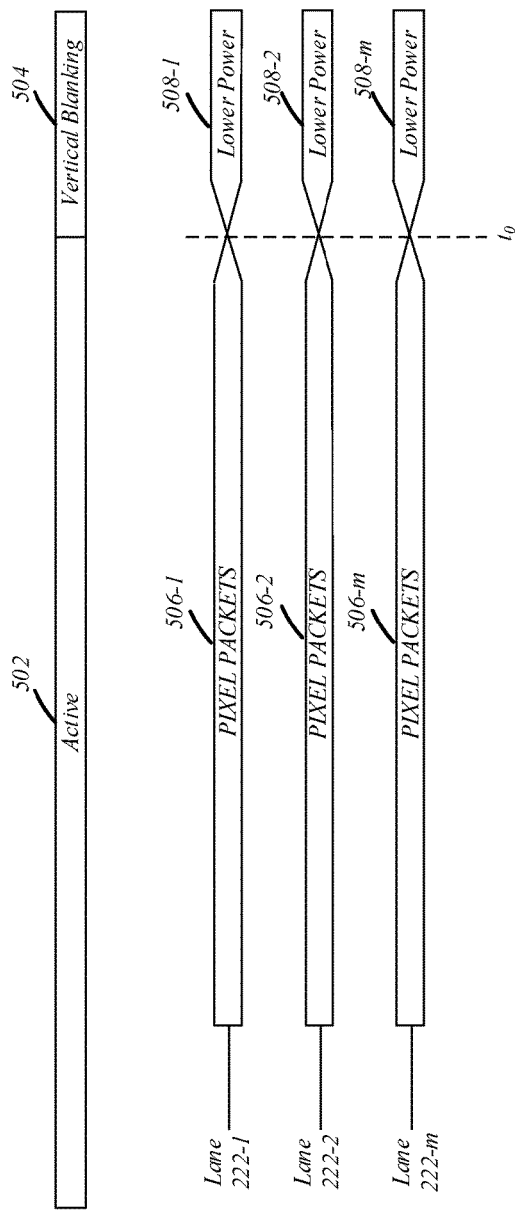
FIG. 5A illustrates an example embodiment of a third set of waveforms.

FIG. 5A illustrates a diagram of waveforms 500 to disable display segments 172. In the illustrated embodiment, each of the display segments 172 may be receiving pixel information 506-m to present during an active period 502. Thus, during the active period 502, transmitters 216, receivers 266, and other supporting circuitry associated with each of the enabled display segments 172 may be in a fully active state to communicate the pixel information 506-m.

In example embodiments, the display processing module 110 may receive an indication to disable the display segments 172. The indication may be caused by a user or one or more sensors, as previously discussed. The display processing module 110 may continue to communicate pixel information 506-1 through 506-m on each of the lanes 222-1 through 222-m until a vertical blanking interval.

At time $t_0$, the display panel 170 having the display segments 172 may enter a vertical blanking interval 504. The vertical blanking interval 504 may be proceeded or start with a blanking start (BS) frame (not shown). Once, the display panel 170 enters the vertical blanking interval 504, the display processing module 110 may communicate lower power indication 508-1 through 508-m on each of the lanes 222-1 through 222-m to disable and put the associated display segments 172 into a lower power state. The lower power indication 508-1 through 508-m may include a disable sequence of pattern having information to put the disabled display segments 172, receivers 266, and associated circuitry of the display controller module 160 into a lower power state, for example. In some embodiments, the display processing module 110 may also put transceivers 216 into a lower power state. The display segments 172, receivers 266 and transmitters 216 may remain in the lower power state until an indication to enable one or more display segments 172 is received by the display processing module 110.

Figure 5B:
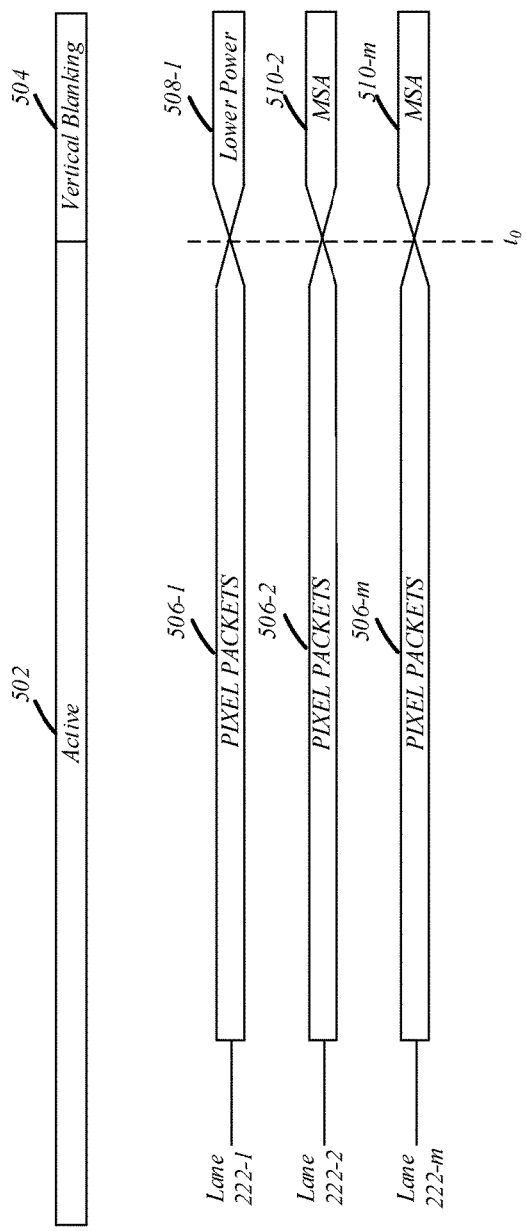
FIG. 5B illustrates an example embodiment of a fourth set of waveforms.

FIG. 5B illustrates a diagram of waveforms 550 to disable a display segments. In the illustrated embodiment, a single display segment 172-1 associated with lane 222-1 is disabled during a vertical blanking interval 504. Each of the display segments 172 may be receiving pixel information 506-1 through 506-m to present during an active period 502. Thus, during the active period 502 transmitters 216, receivers 266, and other supporting circuitry associated with each of the enabled display segments 172 may be in a fully active state to communicate and present the pixel information 506-1 through 506-m.

In example embodiments, the display processing module 110 may receive an indication to disable the display segment 172-1 associated with lane 222-1. The indication may be caused by a user or one or more sensors, as previously discussed. Further, the indication may include information identifying the particular display segment 172-1 and/or associated lane 222-1 to disable. The display processing module 110 may continue to communicate pixel information 506-1 through 506-m on each of the lanes 222-1 through 222-m until a vertical blanking interval.

At time $t_0$, the display panel 170 having the display segments 172 may enter a vertical blanking interval 504. The vertical blanking interval 504 may be proceeded or start with a blanking start (BS) frame (not shown). Once, the display panel 170 enters the vertical blanking interval 504, the display processing module 110 may communicate a lower power indication 508-1 or disable sequence on lane 222-1 to disable and put the associated display segment 172-1 into a lower power state. The lower power indication 508-1 may include information to put a receiver 266-1 and associated circuitry of the display controller module 160 into a lower power state, for example. In some embodiments, the display processing module 110 may also put a transceiver 216-1 into a lower power state. The display segment 172-1, receiver 266-1, and transmitter 216-1 may remain in the lower power state until an indication to enable the display segment 172-1 associated with lane 222-1 is received by the display processing module 110.

In embodiments, during the vertical blanking interval 504, the one or more display segments 172 that are to remain enabled may receive main stream attribute (MSA) data 510. The MSA data 510-2 through 510-m may include information to describe video display timing, pixel clock rate, and pixel format on color parameters for each display segments 172 associated with a particular lane 222-2 through 222-m. Additional information may also be communicated on each of the lanes 222-2 through 222-m during the vertical blanking interval. At the conclusion of the vertical blanking interval 504, the lanes 222-2 through 222-m associated with enabled display segments 172 may resume receiving pixel information. Further and although FIG. 5B illustrates only communicating a lower power 508-1 or disable sequence on a single lane 222-1, embodiments are not limited in this manner and a lower power indication 508 may be communicated any number of lanes 222 include all of them.

Figure 6:
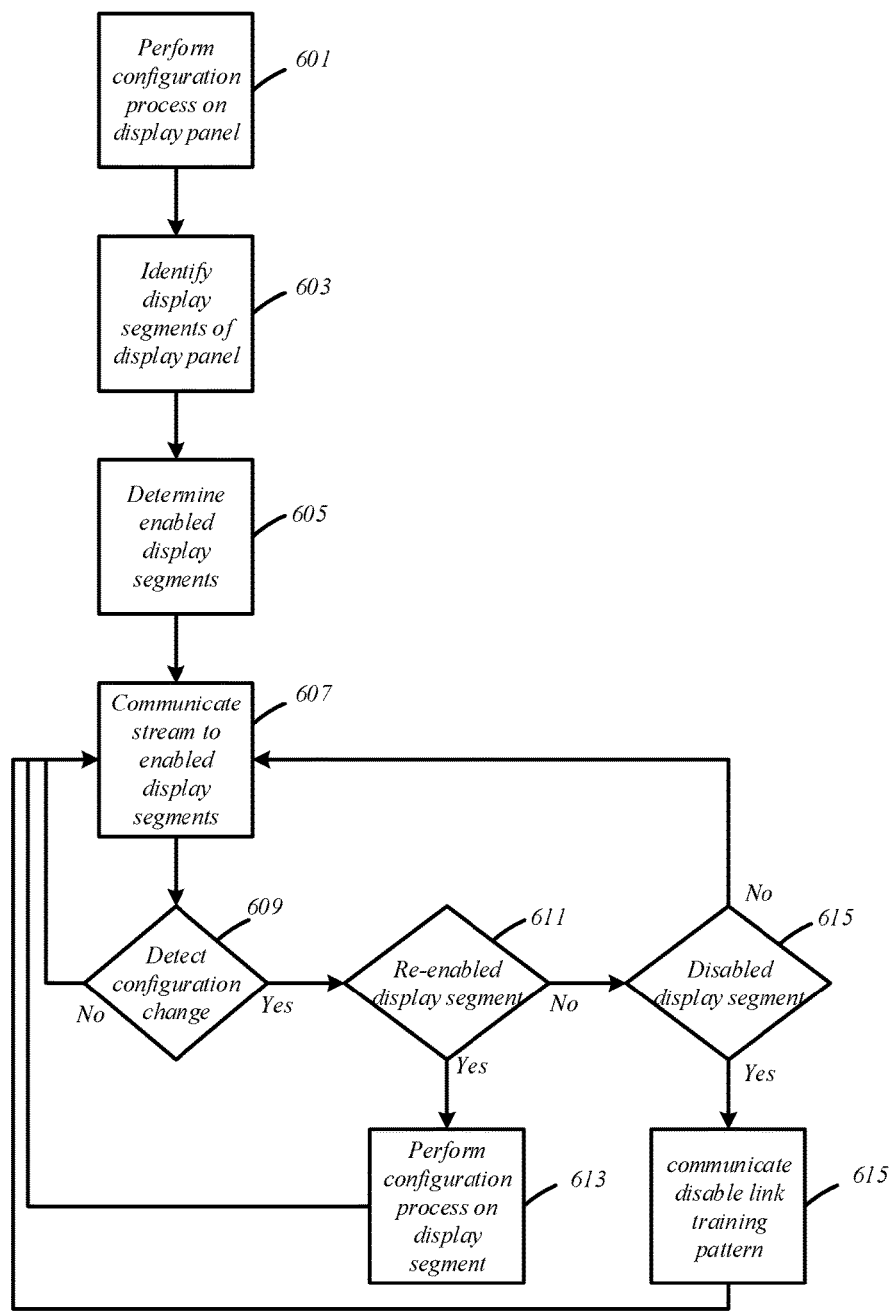
FIG. 6 illustrates an example embodiment of a logic flow.

FIG. 6 illustrates an embodiment of a first logic flow diagram 600. The logic flow 600 may be representative of some or all of the operations executed by one or more embodiments described herein. For example, the logic flow 600 may illustrate operations performed by one or more systems, devices, stations, etc. in FIGS. 1-5B, and 7-9. Various embodiments are not limited in this manner.

At block 601, a configuration process may be performed for a display panel having one or more display segments. The configuration process may include performing link training on one or more lanes of a main link where each lane may be coupled with a particular display segment of the display panel. In embodiments, the configuration process may be initiated by a display processing module and based on one or more indications to enable the display segments of the display panel. During a first initialization, a full link training may be performed on each of the lanes associated with the display segments. However, if link training has been previously performed on any one of the lanes, a partial or fast link training may be performed on those lanes. The fast link training may include configuring the lanes using link training information stored during a previously link training and configuration operation.

At block 603, the logic flow 600 may include identify display segments of the display panel and their association with a lane. For example, identifying information may be received via an AUX channel indicating which display segments of a display panel are associated with which lanes of the main link. Thus, each of the display segments and associated circuitry may be individually controlled including disabled and enabled.

In embodiments, the logic flow 600 may include identifying each of the display segments that are enabled at block 605. For example, during an initialization or a first communication of pixel information all of the display segments of a display panel may be enabled. However, embodiments are not limited in this manner and in some instances less than all of the display segments may be enabled. In embodiments, the display processing module may determine which display segments are enabled based on a received indication which can be user generated or based on one or more sensors, for example. The indication may be received via an AUX channel and/or over the lanes of the main link.

At block 607, the logic flow may communicate a stream to the enabled display segments. More specifically, a stream or a part of a stream including at least pixel information may be communicated to each enabled display segment by sending the stream or part of the stream on the associated lanes of the display segments by the display processing module. The stream or parts of the stream may be received by the display controller module, processed, and presented on each of the enabled display segments. The stream may continue to be sent to the display controller module and display segments until a configuration change is detected at decision block 609 or the communication of the stream is stopped.

If a change in configuration is detected at block 609, a determination may be made at decision block 611 as to whether one or more display segments are being re-enabled. Further, if one or more display segments are being re-enabled at block 611, the logic flow 600 may include performing configuration process on the newly enabled or re-enabled display segment at block 613. The configuration process may include performing link training on the lane associated with the newly enabled or re-enabled display segment. As previously discussed, a fast link training process may performed on a re-enabled lane and display segment using stored link training information. By performing the fast link training process, considerable amount of time may be saved to improve user experience. Once the lane has been link trained or retrained, the stream may be communicated to the display segment including the re-enabled display segment at block 607. In some embodiments more than one display segment may be enabled or re-enabled at a time.

If at decision block 611, one or more display segments are not being re-enabled, a determination as whether one or more display segments are being disabled may be made at decision block 615. If no display segments are being disabled, the stream may be communicated at block 607. However, if one or more display segments are being disabled, the process may include communicating a disable sequence over the lanes associated with the disabled display segments. The disable sequence may include an indication for the display controller module to put the disabled display segments and associated circuitry into a lower power state. Once disabled, the logic flow 600 may continue to communicate the stream to enabled display segments at block 607.

FIG. 7 illustrates an embodiment of a second logic flow diagram 700. The logic flow 700 may be representative of some or all of the operations executed by one or more embodiments described herein. For example, the logic flow 700 may illustrate operations performed by one or more systems or devices in FIGS. 1-5B, 8 and 9. Various embodiments are not limited in this manner.

The logic flow 700 may include identifying one or more display segments of a display panel, each display segment associated with one of a plurality of lanes of a main link coupled with the interface at block 705. The one or more display segments may be identified in information communicated on an AUX channel of a link. The identifying information may include an identification value for each display segment and an indication of an associated lane of a main link.

In some embodiments, the logic flow 700 may include independently controlling enabling and disabling each of the one or more display segments and associated lanes. For example, each of the display segments and associated lane may be independently link trained by performing a link training process. Further, each of the display segments may be individually enabled and disabled by communicating information over the associated lanes. For example, a link training pattern or sequence may be communicated on an associated lane of a newly enabled display segment. Similarly, a disable sequence may be communicated on lanes associated with display segments to disable them.

The logic flow 700 may also include communicating information on each of the lanes of the main link associated with enabled display segments, and to withhold communicating information on each of the lanes of the main link associated disabled display segments at block 715. The information communicated to the enabled display segments may include pixel information of a stream to present on each of the enabled display segments. Further, the information may also include other types of information, such as audio information and video information. Embodiments are not limited in this manner.

Figure 8:
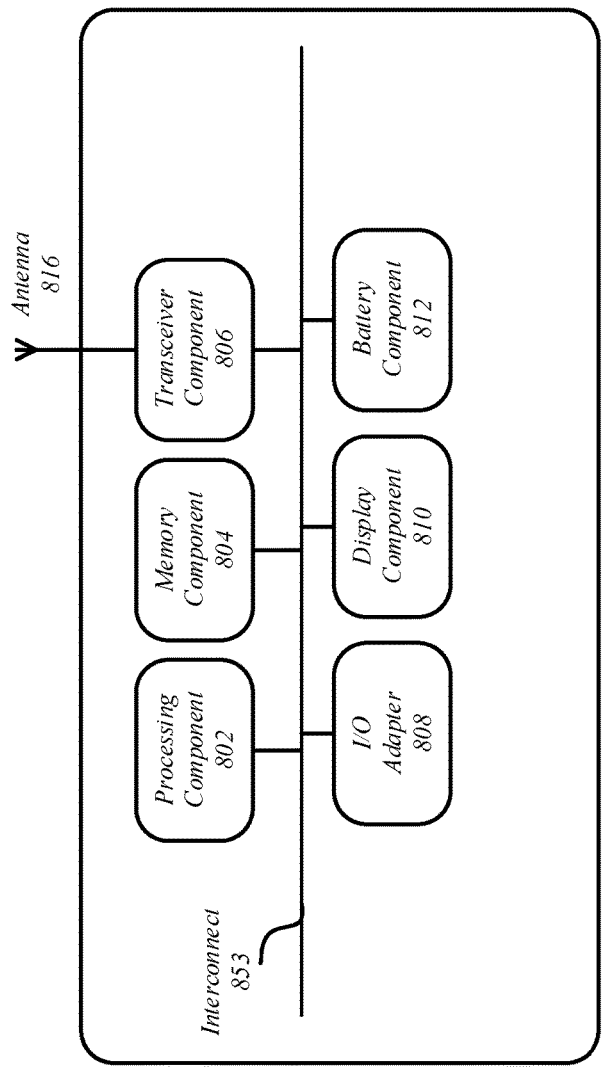
FIG. 8 illustrates an example embodiment of a computing device.

FIG. 8 illustrates an embodiment of a computing device 805. In various embodiments, computing device 805 may be representative of a computing device or system for use with one or more embodiments described herein, such as those discussed in FIGS. 1-7 and 9.

In various embodiments, computing device 805 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a computing device 805 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 805 may be implemented as a smart phone capable of executing computer applications, as well as voice communications and/or data communications. Although some embodiments may be described with a computing device 805 implemented as a smart phone by way of example, it may be appreciated that other embodiments may be implemented using other wireless mobile computing devices as well. The embodiments are not limited in this context. In some embodiments, computing device 805 may also be a navigation system, infotainment system, embedded in home appliances, etc.

As shown in FIG. 8, computing device 805 may include multiple elements. One or more elements may be implemented using one or more circuits, components, registers, processors, software subroutine modules, or any combination thereof, as desired for a given set of design or performance constraints. Although FIG. 8 shows a limited number of elements in a certain topology by way of example, it can be appreciated that more or less elements in any suitable topology may be used in computing device 805 as desired for a given implementation. The embodiments are not limited in this context.

In various embodiments, computing device 805 may include one or more processing unit(s) 802. Processing unit(s) 802 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 802 may be connected to and communicate with the other elements and components of the computing system via an interconnect 543, such as one or more buses, control lines, and data lines.

In one embodiment, computing device 805 may include memory 804 to couple to processing unit(s) 802. In various embodiments, the memory 804 may store data and information for use by the computing device 805.

Memory 804 may be coupled to processing unit(s) 802 via interconnect 853, or by a dedicated communications bus between processing unit(s) 802 and memory 804, as desired for a given implementation. Memory 804 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 804 can store instructions and data momentarily, temporarily, or permanently. The memory 804 may also store temporary variables or other intermediate information while the processing unit(s) 802 is executing instructions. The memory 804 is not limited to storing the above discussed data and may store any type of data.

The computing device 805 may include a transceiver 806 which includes one or more components and circuitry to transmit and receive information using radio-frequency signals. More specifically, the transceiver 806 may include circuitry to produce radio-frequency mobile radio signals which are to be sent and for processing radio-frequency mobile radio signals which have been received. To this end, the transceiver 806 may be coupled to one or more antenna 816. The transmitted or received mobile radio signals are in one or more particular frequency ranges, which are typically prescribed by the mobile radio standard(s) supported by the radio-frequency assemblies. For example, transceiver 806 may include circuitry to process information according to one or more IEEE standards, one or more peer-to-peer protocols, and so forth. Various embodiments are not limited in this manner and transceiver 806 may transmit or receive information via any standard in any frequency range with one more devices, as previously mentioned.

In various embodiments, the transceiver 806 may be used to communicate with one or more other devices or stations via one or more antennas 816. The transceiver 806 may send and receive information from the stations as one or more pockets, frames, and any other transmission structure in accordance with one or more protocols.

The computing device 805 may include input/output adapter 808. Examples of I/O adapter 808 may include Universal Serial Bus (USB) ports/adapters, IEEE 1394 Firewire ports/adapters, and so forth. The embodiments are not limited in this context.

For example, an I/O adapter 808 may also include an input device or sensor, such as one or more buttons, a keyboard, a keypad, a touchscreen display, a touch sensitive device, a microphone, a biometric finger printer reader, biometric eye scanner or any other device used for inputting information into computing device 805. Moreover, the I/O adapter 808 may be a sensor including any hardware or logic to detect one or more touches or inputs on or near a housing of the apparatus, a display of the apparatus including a touchscreen or touch sensitive display.

In various embodiments, the I/O adapter 808 may include one or more components to output information to a user. For example, the I/O adapter 808 may include a speaker to output an audible noise or a haptic feedback device to output a vibration. The I/O adapter 808 may be located any within or on computing device 805, or may be separate and connected to the computing device 805 via a wired or wireless connection.

The computing device 805 may also include a display 810. Display 810 may constitute any display device capable of displaying information received from processor units 802, such as liquid crystal display (LCD), cathode ray tube (CRT) display, a projector, and so forth. Various embodiments are not limited in this manner.

The computing device 805 may also include storage 812. Storage 812 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 812 may include technology to increase the storage performance enhanced protection for valuable digital media when multiple hard drives are included, for example. Further examples of storage 812 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Figure 9:
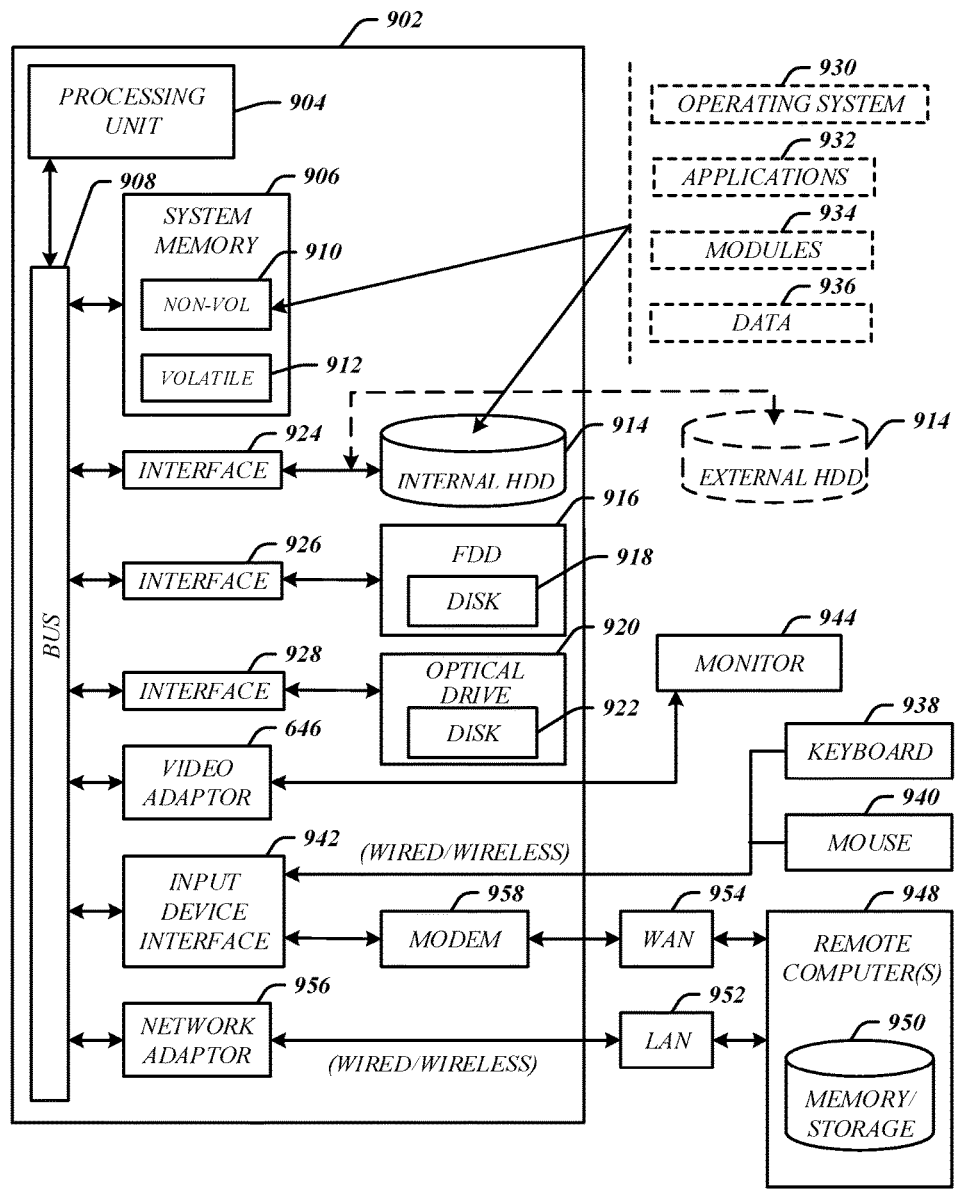
FIG. 9 illustrates an example embodiment of a computing architecture.

FIG. 9 illustrates an embodiment of a computing architecture 900 suitable for implementing various embodiments as previously described. In one embodiment, the computing architecture 900 may comprise or be implemented as part of any one of the previously discussed systems and devices.

As used in this application, the terms "system" and "component" are intended to refer to a computer-related entity, either hardware, a combination of hardware and software, software, or software in execution, examples of which are provided by the computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 100 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, controller, or an apparatus includes an interface operatively coupled to a display panel via a main link, a controller operative to perform link training for one or more display segments of the display panel by communicating a link training pattern sequence on each of a plurality lanes of the main link, identify one or more display segments of the display panel, each display segment associated with one of a plurality of lanes of the main link, and independently control enabling and disabling of the display segments and associated lanes. A system, device, controller, or an apparatus may also include a memory to store a media stream having a video data, display data, or audio data to be communicated over one or more lanes.

In a second example and in furtherance of the first example, a system, device, controller, or an apparatus includes the controller to communicate an enable indication over an auxiliary (AUX) channel to enable a particular display segment and a training pattern sequence over a lane associated with the particular display segment to train or retrain the lane.

In a fourth example and in furtherance of any of the previous examples a system, device, controller, or an apparatus includes the controller to communicate a disable sequence signal on a lane associated with a particular display segment to disable the particular display segment, at least one of the particular display segment, an associated transmitter, and an associated receiver to enter a power savings mode of operation when disabled.

In a fifth example and in furtherance of any of the previous examples a system, device, controller, or an apparatus includes the controller to identify an association between a lane and a display segment based on information received on an auxiliary (AUX) channel.

In a sixth example and in furtherance of any of the previous examples a system, device, controller, or an apparatus includes the controller to communicate the media on each of the lanes of the main link associated with enabled display segments, and to withhold communicating information on each of the lanes of the main link associated disabled display segments.

In a seventh example and in furtherance of any of the previous examples a system, device, controller, or an apparatus includes the controller to store link training information for at least one of the one or more display segments of the display panel based on the link training, the link training information comprising at least one of a link rate, a drive current, a pre-emphasis value, a v-swing value, and an equalization level.

In an eighth example and in furtherance of any of the previous examples a system, device, controller, or an apparatus includes the controller to communicate an enable link training pattern sequence on a lane, the enable link training pattern sequence based on link training information stored during a previous link training.

In a ninth example and in furtherance of any of the previous examples a system, device, controller, or an apparatus includes the controller to communicate an idle pattern on a lane associated with an enabled display segment until a vertical blanking interval is reached.

In a tenth example and in furtherance of any of the previous examples a system, device, controller, or an apparatus includes the controller to communicate the information comprising pixel information to present a display scene on each of the display segments of the display panel.

In an eleventh example and in furtherance of any of the previous examples, at least one non-transitory computer-implemented storage medium comprising instructions that when executed cause processing circuitry to perform link training for one or more display segments of the display panel by communicating a link training pattern sequence on each of a plurality of lanes of a main link, identify one or more display segments of the display panel, each display segment associated with one of the plurality of lanes of the main link coupled with an interface, independently control enabling and disabling of the display segments and associated lanes, and store, in memory, a media stream having a video data, display data, or audio data to be communicated over one or more lanes.

In a twelfth example and in furtherance of any of the previous examples, at least one non-transitory computer-implemented storage medium comprising instructions that when executed cause the processing circuitry to communicate an enable indication over an auxiliary (AUX) channel to enable a particular display segment and a training pattern sequence over a lane associated with the particular display segment to train or retrain the lane.

In a thirteenth example and in furtherance of any of the previous examples, at least one non-transitory computer-implemented storage medium comprising instructions that when executed cause the processing circuitry to cause a squelch detection on a lane associated with a particular display segment to enable the particular display segment, and communicate a training pattern sequence over the lane to train or retrain the lane.

In a fourteenth example and in furtherance of any of the previous examples, at least one non-transitory computer-implemented storage medium comprising instructions that when executed cause the processing circuitry to identify an association between a lane and a display segment based on information received on an auxiliary (AUX) channel.

In a fifteenth example and in furtherance of any of the previous examples, at least one non-transitory computer-implemented storage medium comprising instructions that when executed cause the processing circuitry to identify an association between a lane and a display segment based on information received on an auxiliary (AUX) channel.

In a sixteenth example and in furtherance of any of the previous examples, at least one non-transitory computer-implemented storage medium comprising instructions that when executed cause the processing circuitry to communicate a media stream on each of the lanes of the main link associated with enabled display segments, and to withhold communicating information on each of the lanes of the main link associated disabled display segment.

In a seventeenth example and in furtherance of any of the previous examples, at least one non-transitory computer-implemented storage medium comprising instructions that when executed cause the processing circuitry to store link training information for at least one of the one or more display segments of the display panel based on the link training, the link training information comprising at least one of a link rate, a drive current, a pre-emphasis value, a v-swing value, and an equalization level.

In an eighteenth example and in furtherance of any of the previous examples, at least one non-transitory computer-implemented storage medium comprising instructions that when executed cause the processing circuitry to communicate an enable link training pattern sequence on a lane, the enable link training pattern sequence based on link training information stored during a previous link training.

In a nineteenth example and in furtherance of any of the previous examples, at least one non-transitory computer-implemented storage medium comprising instructions that when executed cause the processing circuitry to communicate an idle pattern on a lane associated with an enabled display segment until a vertical blanking interval is reached.

In a twentieth example and in furtherance of any of the previous examples, a computer-implemented method may include performing, by a processor, link training for one or more display segments of the display panel by communicating a link training pattern sequence on each of a plurality of lanes of a main link, identifying, by the processor, one or more display segments of the display panel, each display segment associated with one of the plurality of lanes of the main link coupled with an interface, independently controlling, by the processor, enabling and disabling of the display segments and associated lanes, and storing, in memory, a media stream having a video data, display data, or audio data to be communicated over one or more lanes.

In a twenty-first example and in furtherance of any of the previous examples, a computer-implemented method may include communicating, by the processor, an enable indication over an auxiliary (AUX) channel to enable a particular display segment and a training pattern sequence over a lane associated with the particular display segment to train or retrain the lane.

In a twenty-second example and in furtherance of any of the previous examples, a computer-implemented method may include causing, by the processor, a squelch detection on a lane associated with a particular display segment to enable the particular display segment, and communicate a training pattern sequence over the lane to train or retrain the lane.

In a twenty-third example and in furtherance of any of the previous examples, a computer-implemented method may include communicating, by the processor, a disable sequence on a lane associated with a particular display segment to disable the particular display segment, at least one of the particular display segment, an associated transmitter, and an associated receiver to enter a power savings mode of operation when disabled.

In a twenty-fourth example and in furtherance of any of the previous examples, a computer-implemented method may include communicating, by the processor, a media stream on each of the lanes of the main link associated with enabled display segments, and to withhold communicating information on each of the lanes of the main link associated disabled display segments.

In a twenty-fifth example and in furtherance of any of the previous examples, a computer-implemented method may include storing, by the processor, link training information for at least one of the one or more display segments of the display panel based on the link training, the link training information comprising at least one of a link rate, a drive current, a pre-emphasis value, a v-swing value, and an equalization level.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
an interface operatively coupled to a display panel via a main link, the display panel comprising a plurality of display segments, the main link comprising a plurality of lanes, each one of the plurality of lanes coupled to a respective one of the plurality of display segments;
a controller operative to:
perform link training for one or more display segments of the display panel by communicating a link training pattern sequence on each one of the plurality lanes of the main link associated with the one or more display segments,
identify the one or more display segments of the display panel, and
independently enable and disable the plurality of display segments and the plurality of lanes; and
a memory to store a media stream having a video data, display data, or audio data to be communicated over one or more of the plurality of lanes.

2. The apparatus of claim 1, the controller to communicate an enable indication over an auxiliary (AUX) channel to enable a particular display segment and a training pattern sequence over a lane associated with the particular display segment to train or retrain the lane.

3. The apparatus of claim 1, the controller to cause a squelch detection on a lane associated with a particular display segment to enable the particular display segment, and communicate a training pattern sequence over the lane to train or retrain the lane.

4. The apparatus of claim 1, the controller to communicate a disable sequence signal on a lane associated with a particular display segment to disable the particular display segment, at least one of the particular display segment, an associated transmitter, and an associated receiver to enter a power savings mode of operation when disabled.

5. The apparatus of claim 1, the controller to identify an association between a lane and a display segment based on information received on an auxiliary (AUX) channel.

6. The apparatus of claim 1, the controller to communicate the media on each of the lanes of the main link associated with enabled display segments, and to withhold communicating information on each of the lanes of the main link associated disabled display segments.

7. The apparatus of claim 1, the controller to store link training information for at least one of the one or more display segments of the display panel based on the link training, the link training information comprising at least one of a link rate, a drive current, a pre-emphasis value, a v-swing value, and an equalization level.

8. The apparatus of claim 1, the controller to communicate an enable link training pattern sequence on a lane, the enable link training pattern sequence based on link training information stored during a previous link training.

9. The apparatus of claim 1, the controller to communicate an idle pattern on a lane associated with an enabled display segment until a vertical blanking interval is reached.

10. The apparatus of claim 1, the controller to communicate the information comprising pixel information to present a display scene on each of the display segments of the display panel.

11. At least one non-transitory computer-implemented storage medium comprising instructions that when executed cause processing circuitry to:
perform link training for one or more display segments of a display panel by communicating a link training pattern sequence on each of a plurality of lanes of a main link, the display panel comprising a plurality of display segments, the main link comprising a plurality of lanes, each one of the plurality of lanes coupled to a respective one of the plurality of display segments;
identify one or more display segments of the display panel;
independently enable and disable the plurality of display segments and the plurality of lanes; and
store, in memory, a media stream having a video data, display data, or audio data to be communicated over one or more of the plurality of lanes.

12. The at least one non-transitory computer-implemented storage medium of claim 11, comprising instructions that when executed cause the processing circuitry to:
communicate an enable indication over an auxiliary (AUX) channel to enable a particular display segment and a training pattern sequence over a lane associated with the particular display segment to train or retrain the lane.

13. The at least one non-transitory computer-implemented storage medium of claim 11, comprising instructions that when executed cause the processing circuitry to:
cause a squelch detection on a lane associated with a particular display segment to enable the particular display segment, and communicate a training pattern sequence over the lane to train or retrain the lane.

14. The at least one non-transitory computer-implemented storage medium of claim 11, comprising instructions that when executed cause the processing circuitry to:
communicate a disable sequence on a lane associated with a particular display segment to disable the particular display segment, at least one of the particular display segment, an associated transmitter, and an associated receiver to enter a power savings mode of operation when disabled.

15. The at least one non-transitory computer-implemented storage medium of claim 11, comprising instructions that when executed cause the processing circuitry to:
identify an association between a lane and a display segment based on information received on an auxiliary (AUX) channel.

16. The at least one non-transitory computer-implemented storage medium of claim 11, comprising instructions that when executed cause the processing circuitry to:
communicate a media stream on each of the lanes of the main link associated with enabled display segments, and to withhold communicating information on each of the lanes of the main link associated disabled display segment.

17. The at least one non-transitory computer-implemented storage medium of claim 11, comprising instructions that when executed cause the processing circuitry to:
store link training information for at least one of the one or more display segments of the display panel based on the link training, the link training information comprising at least one of a link rate, a drive current, a pre-emphasis value, a v-swing value, and an equalization level.

18. The at least one non-transitory computer-implemented storage medium of claim 11, comprising instructions that when executed cause the processing circuitry to:
communicate an enable link training pattern sequence on a lane, the enable link training pattern sequence based on link training information stored during a previous link training.

19. The at least one non-transitory computer-implemented storage medium of claim 11, comprising instructions that when executed cause the processing circuitry to:
communicate an idle pattern on a lane associated with an enabled display segment until a vertical blanking interval is reached.

20. A computer-implemented method, comprising:
performing, by a processor, link training for one or more display segments of a display panel by communicating a link training pattern sequence on each of a plurality of lanes of a main link, the display panel comprising a plurality of display segments, the main link comprising a plurality of lanes, each one of the plurality of lanes coupled to a respective one of the plurality of display segments;
identifying, by the processor, one or more display segments of the display panel;
independently enable and disable, by the processor, the plurality of display segments and the plurality of lanes; and
storing, in memory, a media stream having a video data, display data, or audio data to be communicated over one or more of the plurality of lanes.

21. The computer-implemented method of claim 20, comprising:
communicating, by the processor, an enable indication over an auxiliary (AUX) channel to enable a particular display segment and a training pattern sequence over a lane associated with the particular display segment to train or retrain the lane.

22. The computer-implemented method of claim 20, comprising:
causing, by the processor, a squelch detection on a lane associated with a particular display segment to enable the particular display segment, and communicate a training pattern sequence over the lane to train or retrain the lane.

23. The computer-implemented method of claim 20, comprising:
communicating, by the processor, a disable sequence on a lane associated with a particular display segment to disable the particular display segment, at least one of the particular display segment, an associated transmitter, and an associated receiver to enter a power savings mode of operation when disabled.

24. The computer-implemented method of claim 20, comprising:
communicating, by the processor, a media stream on each of the lanes of the main link associated with enabled display segments, and to withhold communicating information on each of the lanes of the main link associated disabled display segments.

25. The computer-implemented method of claim 20, comprising:

storing, by the processor, link training information for at least one of the one or more display segments of the display panel based on the link training, the link training information comprising at least one of a link rate, a drive current, a pre-emphasis value, a v-swing value, and an equalization level.

\* \* \* \* \*